US012781926B2

(12) United States Patent
Junkins et al.

(10) Patent No.: US 12,781,926 B2
(45) Date of Patent: Nov. 3, 2026

(54) WATERTIGHT LIGHT STRING WITH SERIAL DATA SIGNAL CONTROLLER

(71) Applicant: Celebright Inc., Ottawa (CA)

(72) Inventors: Dan Junkins, Ottawa (CA); Jason Fee, Ottawa (CA)

(73) Assignee: Celebright Inc.

( * ) Notice: Subject to any disclaimer, the term of this patent is extended or adjusted under 35 U.S.C. 154(b) by 53 days.

(21) Appl. No.: 19/094,979

(22) Filed: Mar. 30, 2025

(65) Prior Publication Data

US 2026/0063254 A1 Mar. 5, 2026

Related U.S. Application Data

(60) Provisional application No. 63/689,435, filed on Aug. 30, 2024.

(51) Int. Cl.

| | |
|---|---|
| ***F21S 4/10*** | (2016.01) |
| ***F21V 23/00*** | (2015.01) |
| ***F21V 23/06*** | (2006.01) |
| ***F21V 27/02*** | (2006.01) |
| ***F21V 31/00*** | (2006.01) |
| *F21Y 115/10* | (2016.01) |

(52) U.S. Cl.

CPC .............. *F21S 4/10* (2016.01); *F21V 23/002* (2013.01); *F21V 23/005* (2013.01); *F21V 23/06* (2013.01); *F21V 27/02* (2013.01); *F21V 31/005* (2013.01); *F21Y 2115/10* (2016.08)

(58) Field of Classification Search

CPC ........ F21S 4/10; F21V 19/003; F21V 19/006; F21V 19/0065; F21V 23/002; F21V 23/005; F21V 23/26; F21Y 2203/10

See application file for complete search history.

(56) References Cited

U.S. PATENT DOCUMENTS

| | | | | |
|---|---|---|---|---|
| 5,957,564 | A * | 9/1999 | Bruce | F21S 9/032 362/184 |
| 7,887,218 | B2 * | 2/2011 | Wang | F21S 4/20 362/240 |
| 8,083,381 | B2 * | 12/2011 | Tsai | F21V 17/164 362/249.02 |
| 8,167,454 | B2 * | 5/2012 | Maier | H10H 20/853 362/249.02 |
| 8,360,608 | B2 * | 1/2013 | Wildner | F21S 4/20 362/249.11 |
| 10,731,831 | B2 * | 8/2020 | Chang | F21V 21/088 |
| 11,421,834 | B1 * | 8/2022 | Yin | F21V 19/0035 |
| 11,821,597 | B1 * | 11/2023 | Irons | F21S 4/28 |
| 12,013,104 | B2 * | 6/2024 | Dai | H05B 45/10 |
| 12,108,504 | B2 * | 10/2024 | Lin | F21S 4/10 |
| 12,379,078 | B1 * | 8/2025 | Ban | F21V 15/01 |
| 2015/0159844 | A1 * | 6/2015 | Flaherty | F21S 4/10 362/249.02 |
| 2016/0010814 | A1 * | 1/2016 | Peng | F21V 31/005 362/244 |

* cited by examiner

*Primary Examiner* — Ismael Negron

(57) ABSTRACT

A lighting system comprising at least one bulb assembly, an integrated switching power supply, a plurality of electrical wires electrically connecting the bulb assembly to the power supply, and male/female connectors. The bulb assembly has a housing including a light source disposed on a surface of a printed circuit board (PCB), at least one processor provided on the PCB, at least one electrical connector disposed on another surface of the PCB and configured to connect to the plurality of wires, and a means for sealing the housing against water ingress.

18 Claims, 17 Drawing Sheets

WATERTIGHT LIGHT STRING WITH SERIAL DATA SIGNAL CONTROLLER

CROSS REFERENCE TO RELATED APPLICATIONS

This application claims priority to and the benefits of U.S. Provisional Application Ser. No. 63/689,435, entitled "INTEGRATED SWITCHING POWER SUPPLY IN LIGHT STRING FOR PERMANENT HOLIDAY LIGHTING SYSTEMS" filed on Aug. 30, 2024, the disclosure of which is incorporated herein by reference in its entirety.

BACKGROUND

The embodiments described herein relate to outdoor lighting, in particular, technologies related power management for outdoor lighting.

The present disclosure relates to power management systems for lighting, specifically to a switching power supply integrated into light strings of a permanent outdoor lighting system. This system is designed to regulate higher input voltages entering the light string to lower operational voltages for individual bulbs, optimizing power distribution and reducing installation complexity.

Remote controllable permanent holiday lighting systems (i.e., Christmas lights) often require a significant number of power and data connections, especially when large installations are involved. Traditional systems typically run on a lower voltage supplied directly to the bulbs, which can lead to electrical line losses and increased complexity in wiring. The need for separate power and data wires also increases the number of connection points, which can lead to reliability issues and greater installation time.

It may be desirable to provide a system and method for an integrated switching power supply in light strings for outdoor lighting.

SUMMARY

An integrated switching power supply in light string for a holiday lighting system. The system provides an integrated switching power supply within the light strings of a permanent holiday lighting system. Each string of 1 to 16 bulbs includes a built-in regulator that steps down a higher input voltage (typically 12-36V) to a lower operational voltage (ranging from 3-12V) suitable for the individual bulbs. This approach minimizes the need for separate power and data wires, reduces connection points, and leads to less electrical line loss.

DETAILED DESCRIPTION

The integrated switching power supply described in this disclosure represents a significant advancement in the design of permanent holiday lighting systems. By incorporating the power supply into the light strings themselves, this disclosure simplifies installation, reduces the number of connection points, and improves overall system efficiency, making it an ideal solution for both residential and commercial outdoor lighting applications.

Figure 1A:
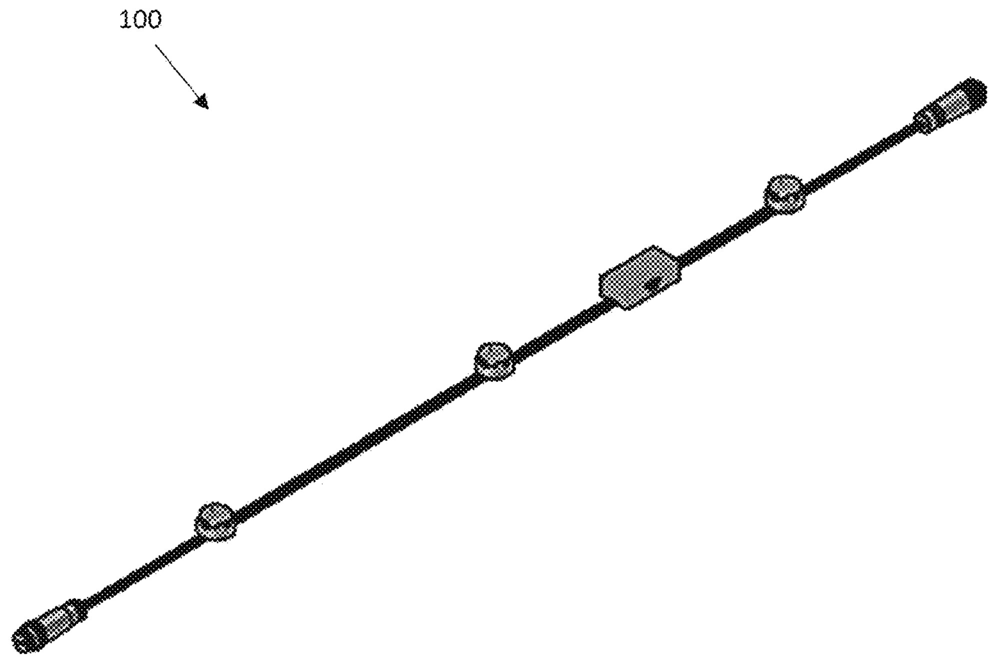
FIG. 1A is a diagram illustrating a perspective view of an exemplary string lighting system.

FIG. 1A is a diagram illustrating a perspective view of an exemplary string lighting system.

Figure 1B:
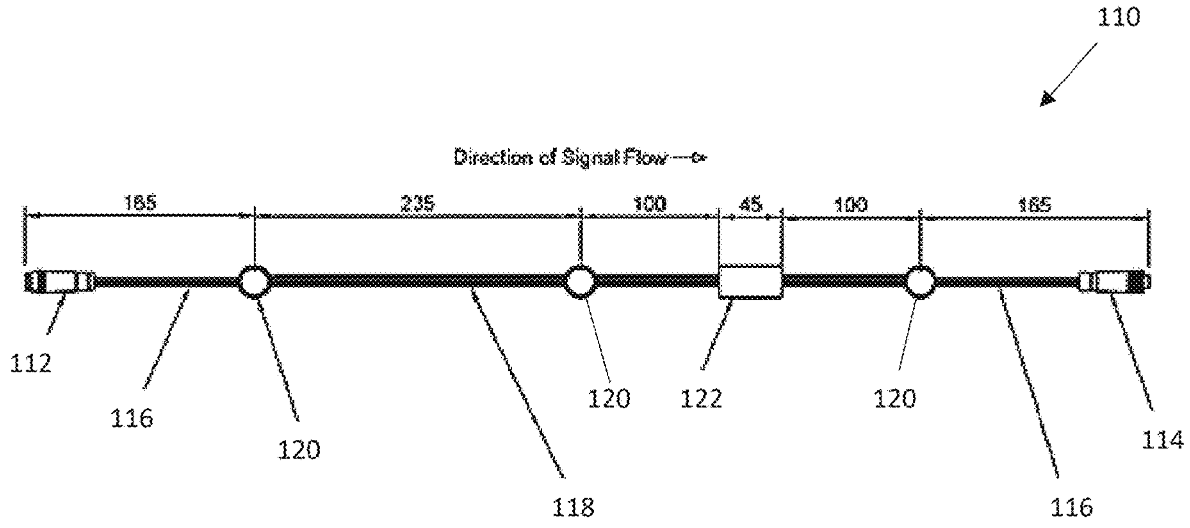
FIG. 1B is a diagram illustrating the exemplary string lighting system with a regulator enclosure to be built into a light string.

FIG. 1B is a diagram illustrating an exemplary string lighting system with a regulator enclosure to be built into a light string. According to FIG. 1B, string lighting system 110 is shown having an input male 3-pin connector 112, an output female 3-pin connector 114, a 3-conductor wire 116, a 4-conductor wire 118, a regulator enclosure 122 and one or more bulb enclosures 120 (also known as bulb assemblies or bulb connectors) that are configured to receive individual light bulbs or are configured to include integrated light bulbs (i.e., the bulb connector or bulb assembly includes the light bulb).

According to the disclosure, the light bulb can be a 20 mm bulb. In further embodiments the light bulb can have a range of 5 mm to 50 mm. The length of the 3-conductor wire 116 is approximately 165 mm. The length of the 4-conductor wire 118 (found between the bulb connectors 120 and the regulator enclosure 122) is 235 mm. The length of the regulator enclosure is 45 mm. The direction of signal flow is from the input male connector 112 to the output female connector 114.

Figure 2:
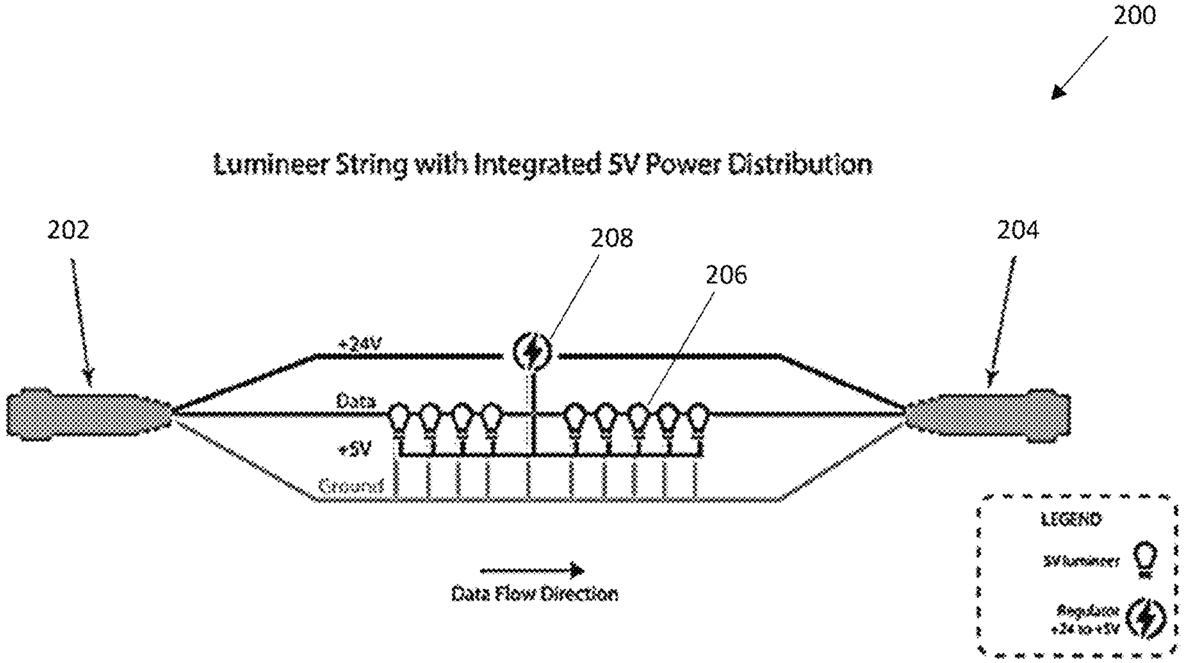
FIG. 2 is a diagram illustrating signal distribution in the light string.

FIG. 2 is a diagram illustrating signal distribution in the light string. FIG. 2 is an example of how 24V or 36V power enters and then is regulated down to 5V and is distributed to the 5V bulb (smart LEDs or smart bulb) within the string.

According to FIG. 2, light string 200 is shown with an integrated 5V power distribution. Light string 200 comprises a male 3-pin connector 202, a female 3-pin connector 204, a plurality of 5V bulbs 206 (or smart LEDs) and a regulator 208. Each of the male 3-pin connector 202 and the female 3-pin connector 204 further comprises a 24V line, a data line and a ground line. Regulator 208 is configured to regulate voltage from +24V to +5V. According to further embodiments, regulator 208 may be further configured to regulate from a range of +36V to +5V.

Figure 3:
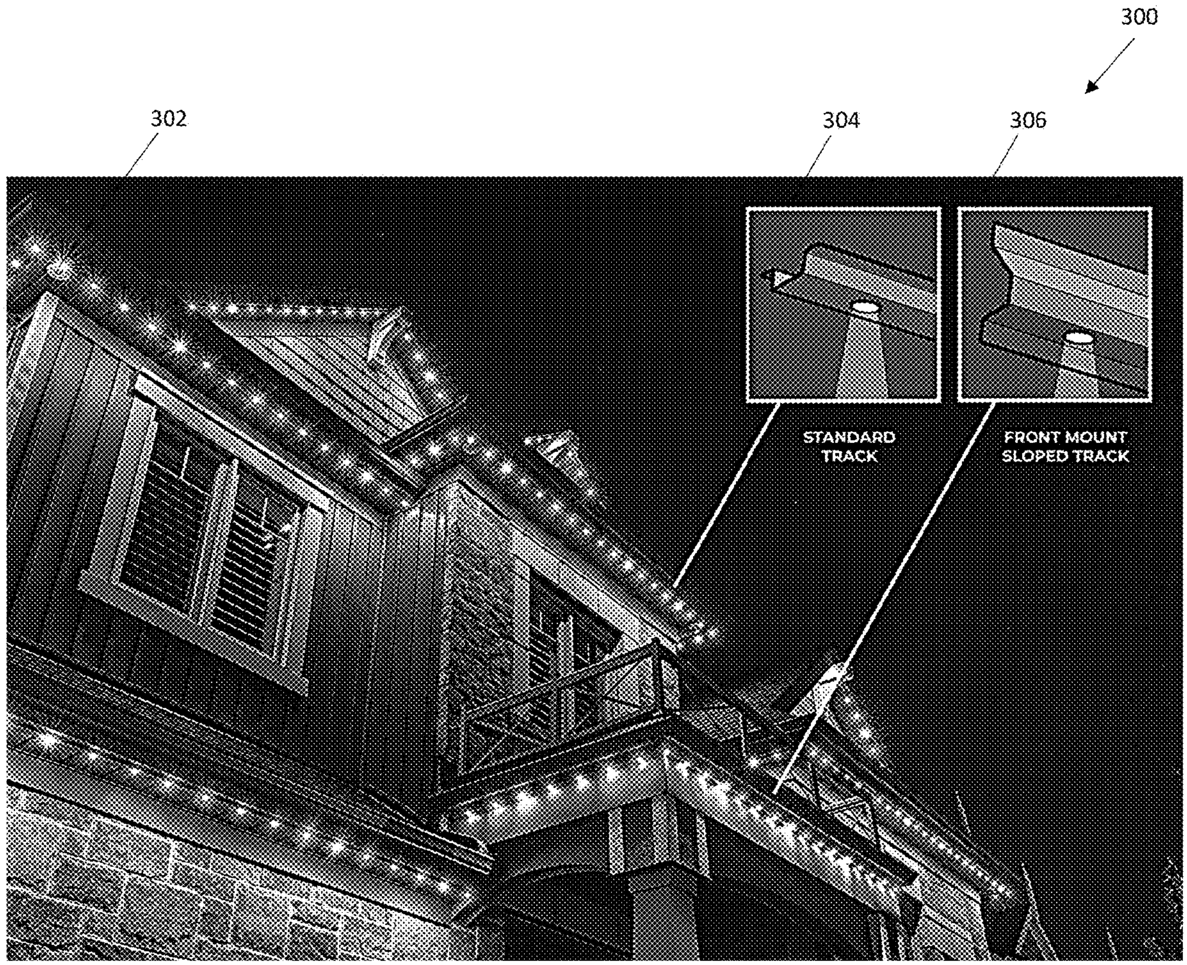
FIG. 3 is a diagram illustrating the string lighting system installed on the front of a house.

FIG. 3 is a diagram illustrating the string lighting system installed on the front of a house. According to FIG. 3, house diagram 300 is shown to have string lighting system 302 that is mounted on either a standard track 304 or a front mount sloped track 306.

Figure 4A:
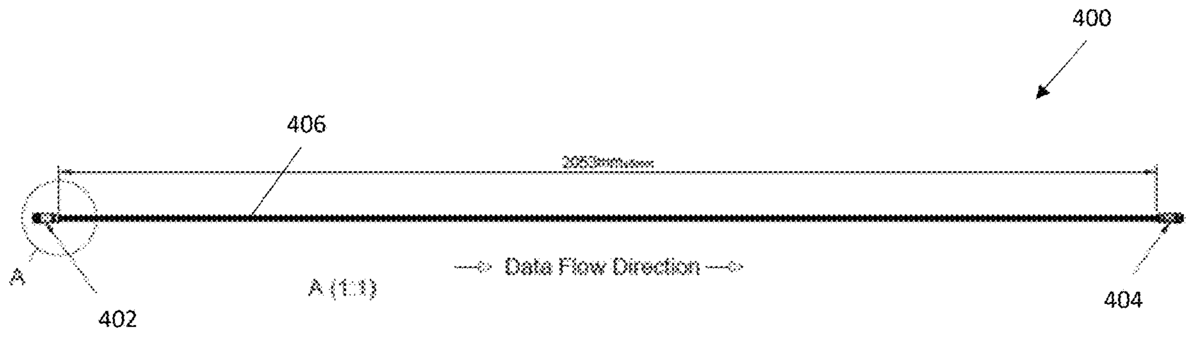
FIG. 4A is a diagram illustrating the wire cable of the string lighting system.

FIG. 4A is a diagram illustrating the wire cable of the string lighting system. According to FIG. 4, wire cable 400 comprises a male end connector 402, a female end connector 404 and cable 406 that is 2053 mm in length. The wire cable 400 can be a SC24-LS9IDC cable. Male end connector 402 can be a M12 style input male end and a female end connector 404 can be a M12 style output female end. Data flow direction is from the male end connector 402 to the female end connector 404.

Figure 4B:
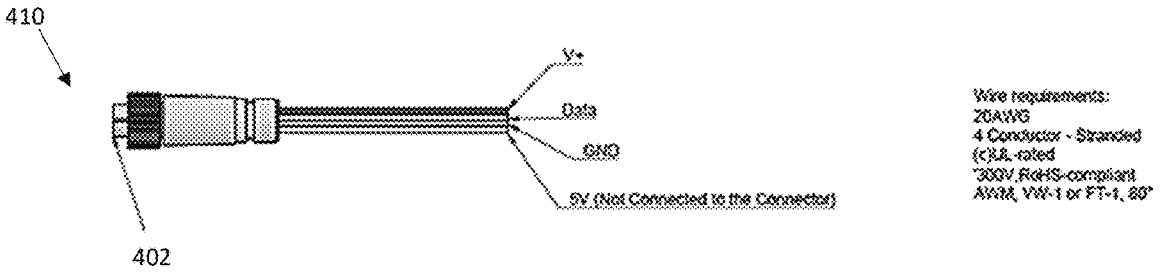
FIG. 4B is a diagram illustrating the male end connector.

FIG. 4B is a diagram illustrating the male end connector. According to FIG. 4B, cable 410 comprises of male end connector 402 comprising of a V+ line, a data line, a ground line and a 5V line that may not be connected to the connector.

Figure 4C:
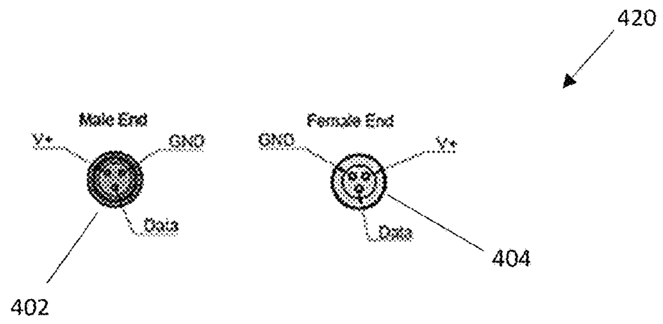
FIG. 4C is a diagram illustrating a plan view of the male and female ends of the connectors.

FIG. 4C is a diagram illustrating a plan view of the male and female ends of the connectors. Diagram 420 shows the male end of the male end connector 402 and female end of female end connector 404. Each of the male end and female end comprises a V+ line, a ground (GND) line and a data line. Furthermore, there may be a 5V wire line that is left unconnected.

Figure 5A:
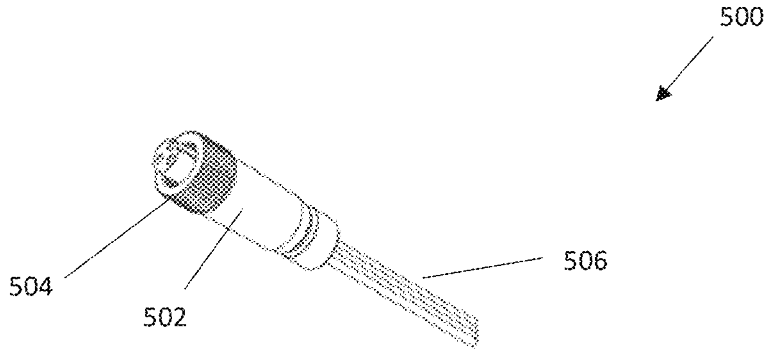
FIG. 5A is a diagram illustrating a perspective view of the female end connector.

FIG. 5A is a diagram illustrating a perspective view of the female end connector. According to FIG. 5A, diagram 500 is shown having female end connector 502, locking nut 504 and cable 506. Locking nut 504 can be a M12X1 locking nut.

Figure 5B:
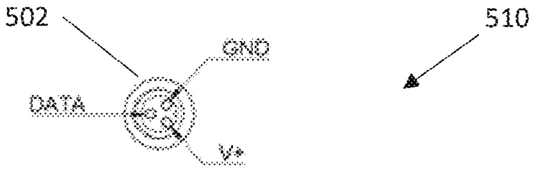
FIG. 5B is a diagram illustrating a front plan view of the female end connector.

FIG. 5B is a diagram illustrating a front plant view of the female end connector. According to FIG. 5B, diagram 510 illustrating female end connector 502 is shown having a V+ line, data line and ground (GND) line.

Figure 5C:
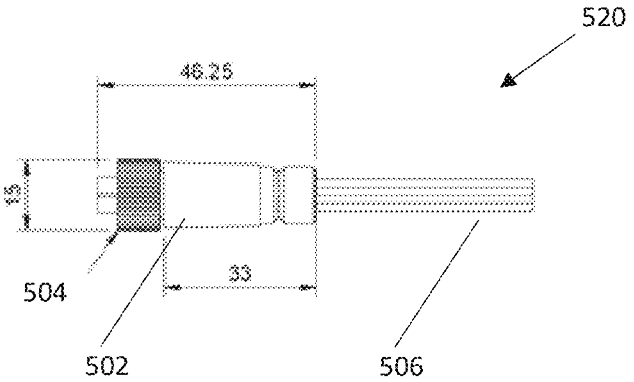
FIG. 5C is a diagram illustrating a side view of the female end connector.

FIG. 5C is a diagram illustrating a side view of the female end connector. According to FIG. 5C, diagram 520 is shown having female end connector 502, locking nut 504 and cable 506. The dimensions of this embodiment of the entire end connector is 46.25 mm length with the female end connector 502 being 33 mm. Furthermore, the width or diameter of the locking nut 504 is 15 mm.

Figure 6A:
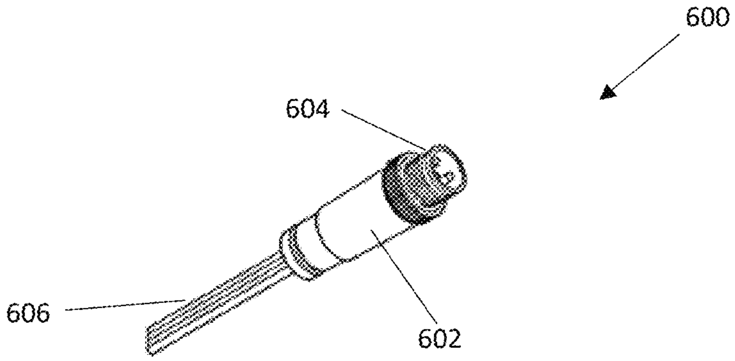
FIG. 6A is a diagram illustrating a perspective view of the male end connector.

FIG. 6A is a diagram illustrating a perspective view of the male end connector. According to FIG. 6A, diagram 600 is shown having male end connector 602, threaded bolt 604 and cable 606. Threaded bolt 604 can be a M12X1 threaded bolt that is configured to mate with locking nut 504.

Figure 6B:
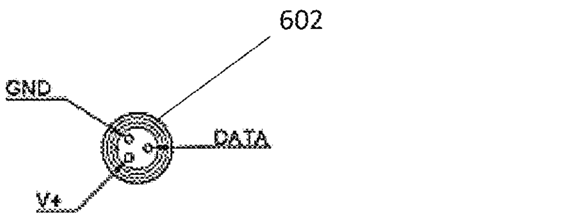
FIG. 6B is a diagram illustrating a front plan view of the male end connector.

FIG. 6B is a diagram illustrating a front plant view of the male end connector. According to FIG. 6B, diagram 610 illustrating male end connector 602 is shown having a V+ line, data line and ground (GND) line.

Figure 6C:
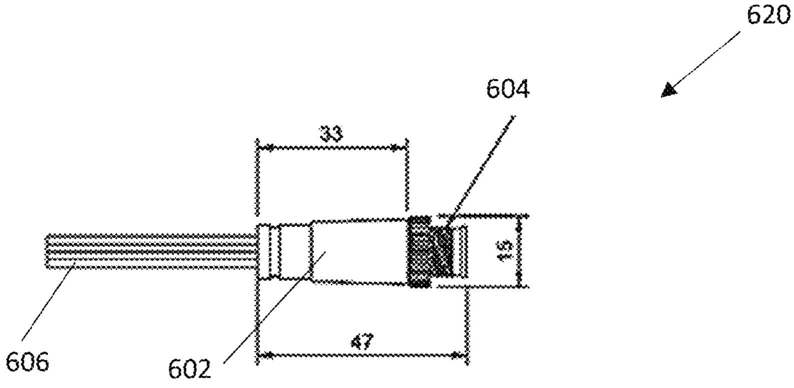
FIG. 6C is a diagram illustrating a side view of the male end connector.

FIG. 6C is a diagram illustrating a side view of the male end connector. According to FIG. 6C, diagram 620 is shown having male end connector 602, threaded bolt 604 and cable 606. The dimensions of this embodiment of the entire end connector is 47 mm length with the female end connector 602 being 33 mm. Furthermore, the width or diameter of the threaded bolt 604 is 15 mm.

Figure 7A:
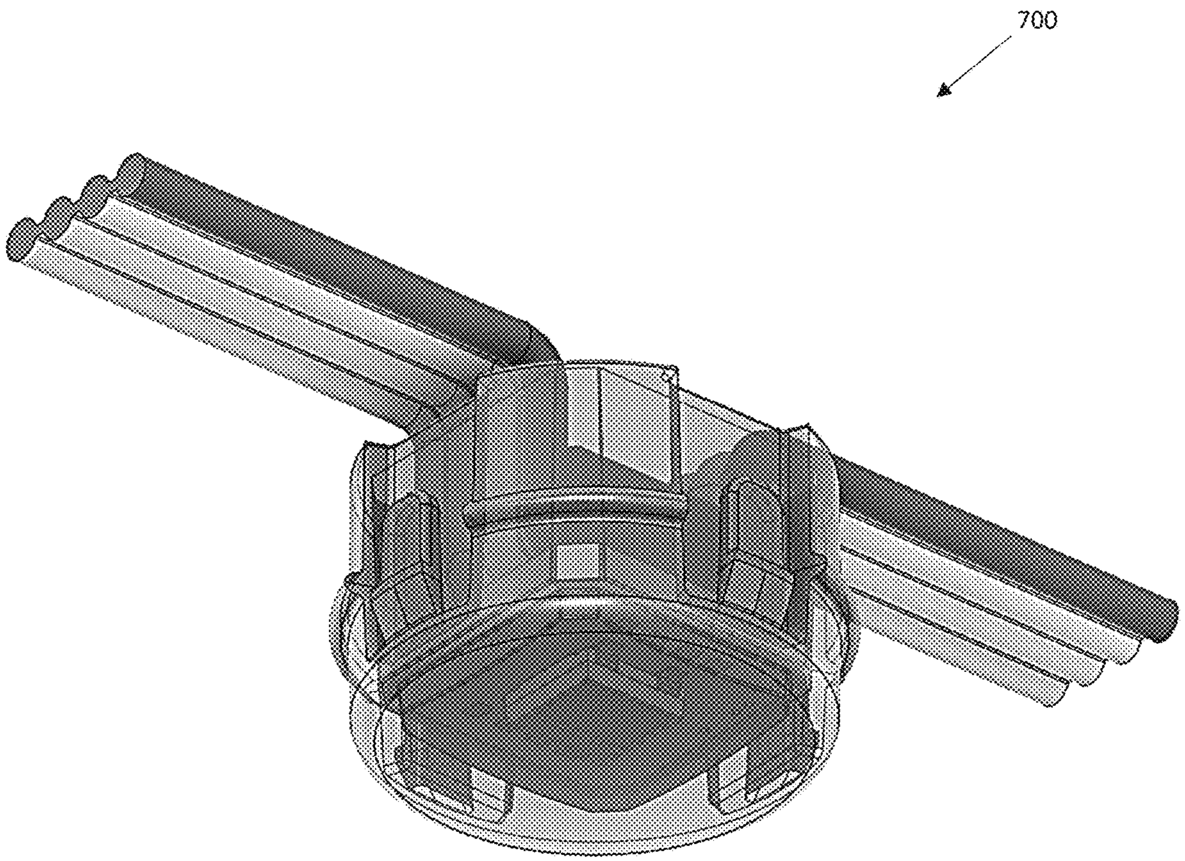
FIG. 7A is a diagram illustrating a bottom perspective view of the bulb enclosure.
Figure 7B:
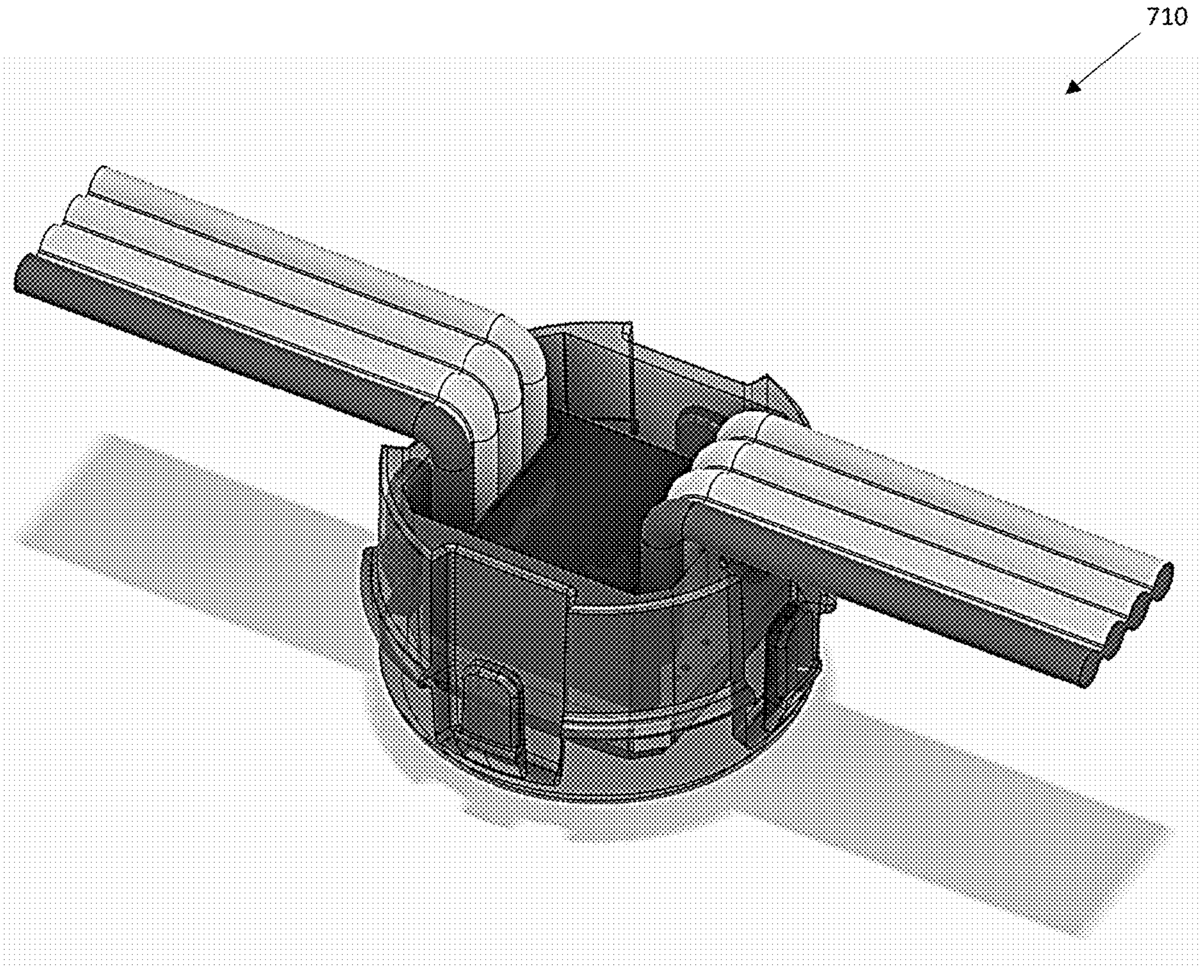
FIG. 7B is a diagram illustrating a top perspective view of the bulb enclosure.

FIG. 7A is a diagram illustrating a bottom perspective view of the bulb enclosure 700. FIG. 7B is a diagram illustrating a top perspective view of the bulb enclosure 710.

Figure 7C:
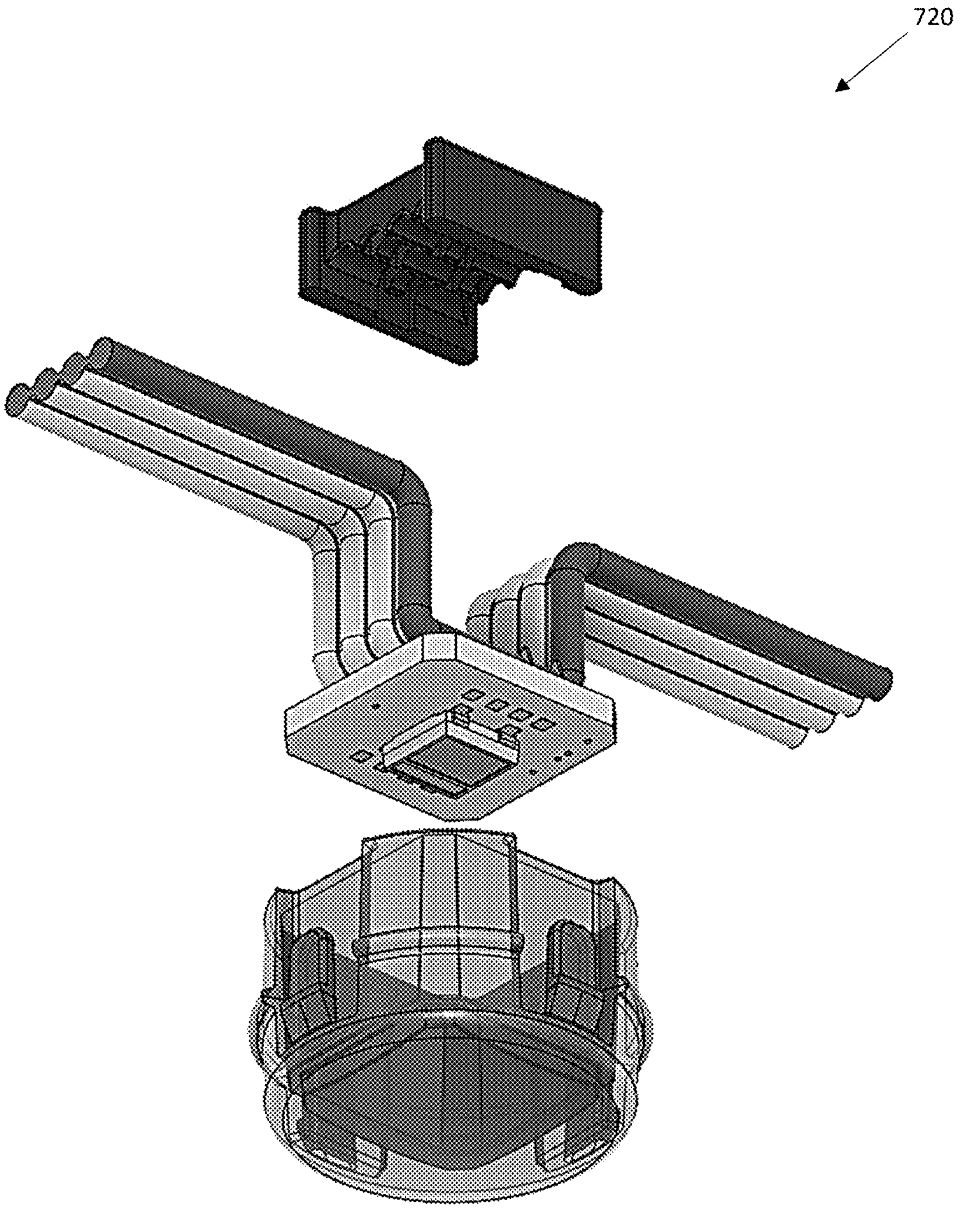
FIG. 7C is a diagram illustrating a bottom exploded view of the bulb enclosure.
Figure 7D:
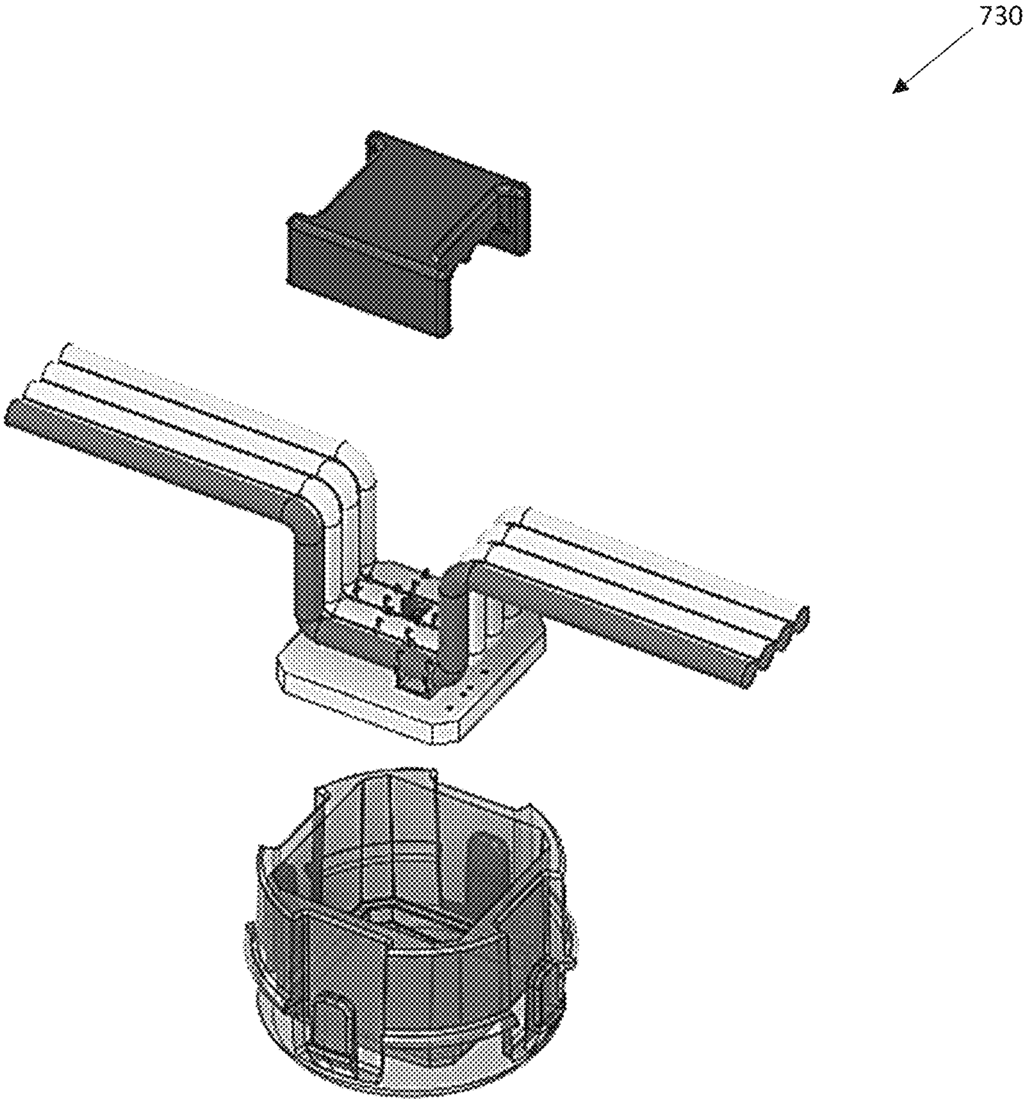
FIG. 7D is a diagram illustrating a top exploded view of the bulb enclosure.

FIG. 7C is a diagram illustrating a bottom exploded view of the regulator enclosure 720. FIG. 7D is a diagram illustrating a top exploded view of the bulb enclosure 730.

Figure 7E:
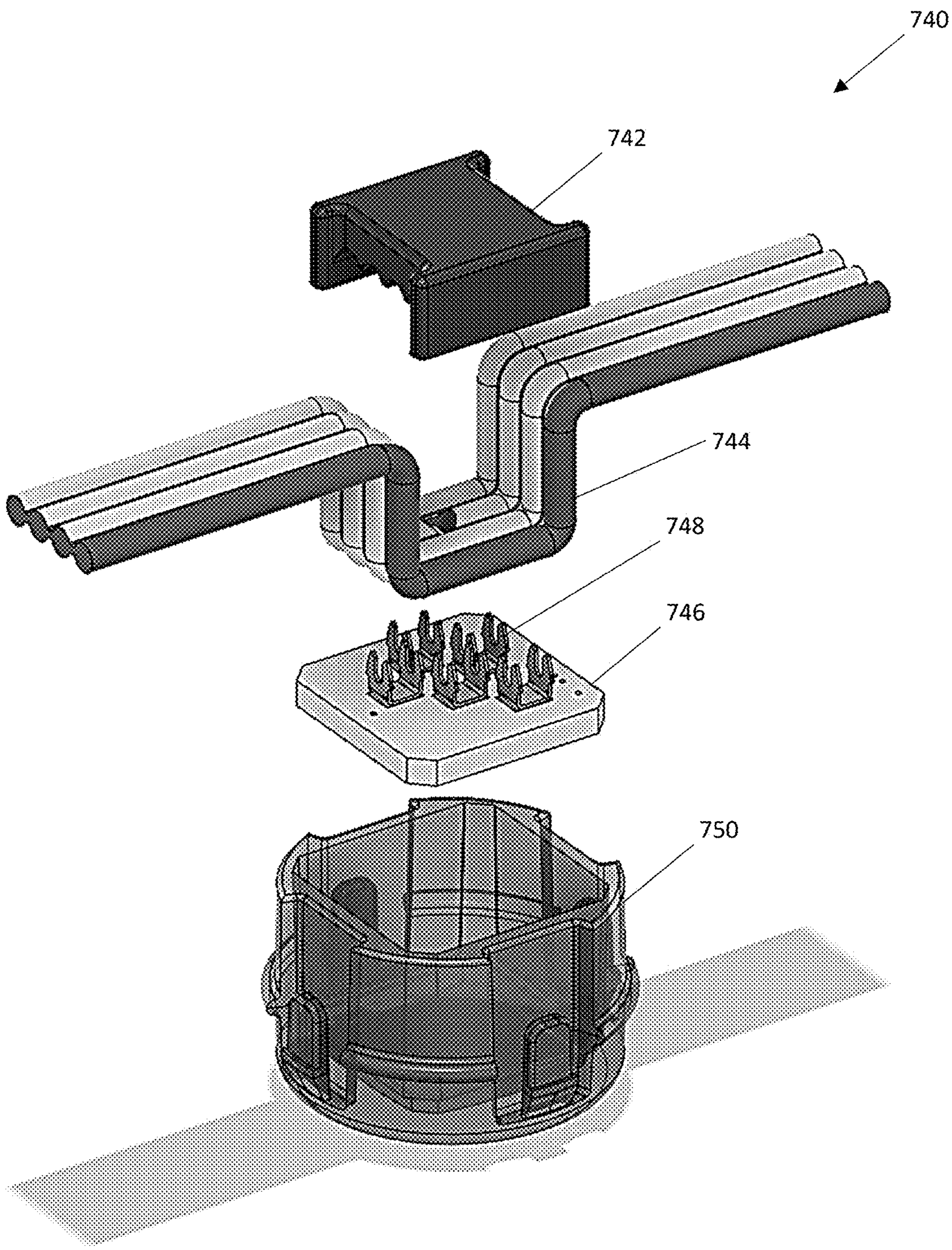
FIG. 7E is a diagram illustrating an exploded view of all of the components of the bulb enclosure.

FIG. 7E is a diagram illustrating an exploded view of all of the components of the bulb enclosure 740. According to FIG. 7E, bulb enclosure 740 comprises an upper assembly 742, a printed circuit board (PCB) 746 having a plurality of prongs 748, a substantially cylindrical housing 750 and a plurality of electrical wires 744 that are substantially shaped (i.e., U-shaped) to conform to the housing when assembled. The prongs 748 are configured to snap or securely fasten the electrical wires 744 to the lower assembly. Furthermore, the prongs 748 are insulation displacement connectors (IDCs) and serve to make the electrical connections to the wire and to a certain extent hold the wires in place. By pressing the wires into the IDCs the insulation is cut and connection between the wire and metal IDC is made. IDCs are electrical connectors that establish connections to insulated wires by forcing sharpened blades through the insulation, bypassing the need for stripping.

Figure 7F:
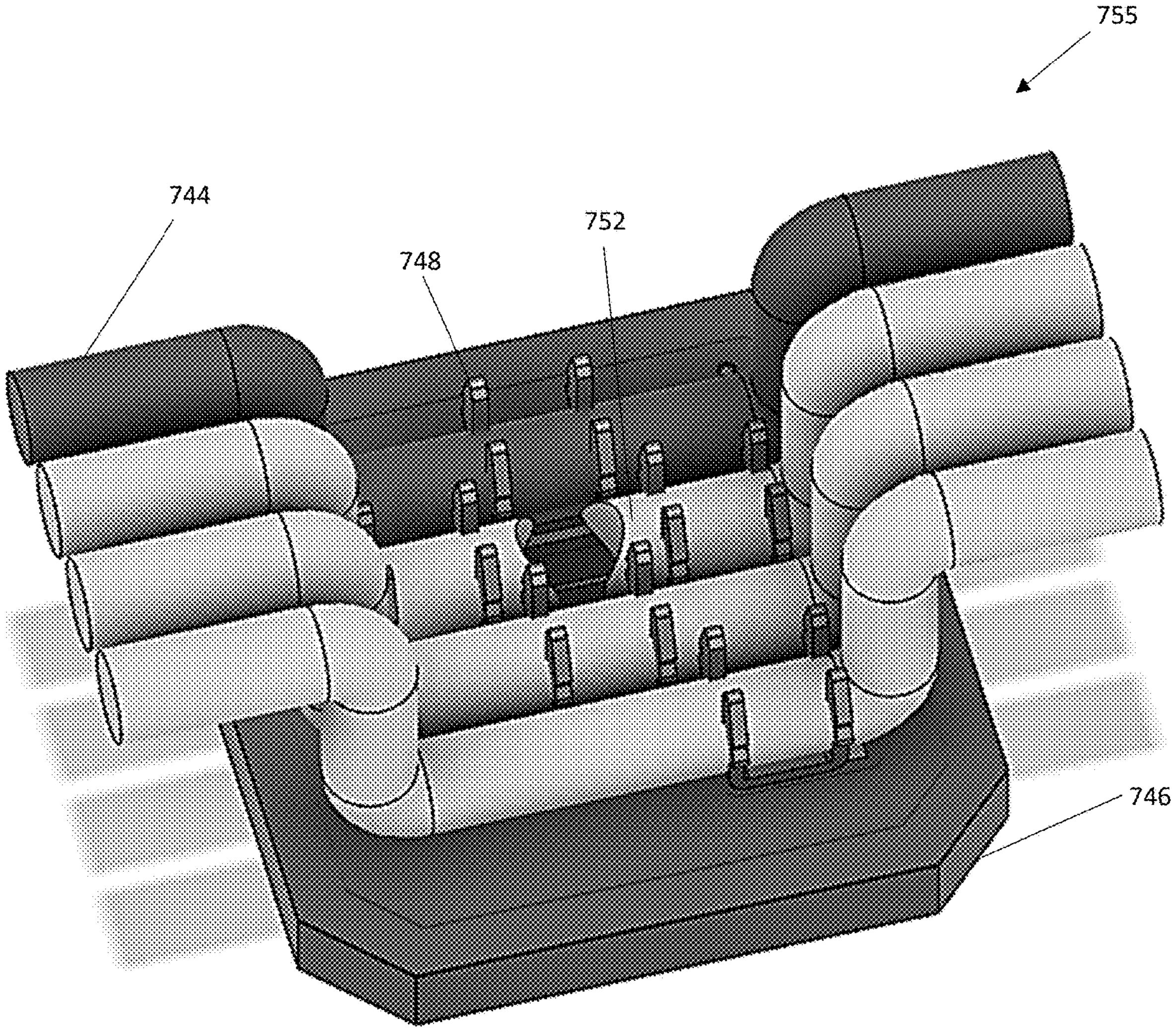
FIG. 7F is a diagram illustrating a top close-up view of the lower assembly and the wire of the bulb enclosure.

FIG. 7F is a diagram illustrating a top close-up view of the printed circuit board (PCB) 746 and electrical wires 744 of the bulb enclosure 755. According to FIG. 7F, the diagram shows the lower assembly 746 with a plurality of prongs 748 and electrical wires 744. One of these wires is an insulation displacement connector (IDC) 752 wherein the data line is cut.

Figure 7G:
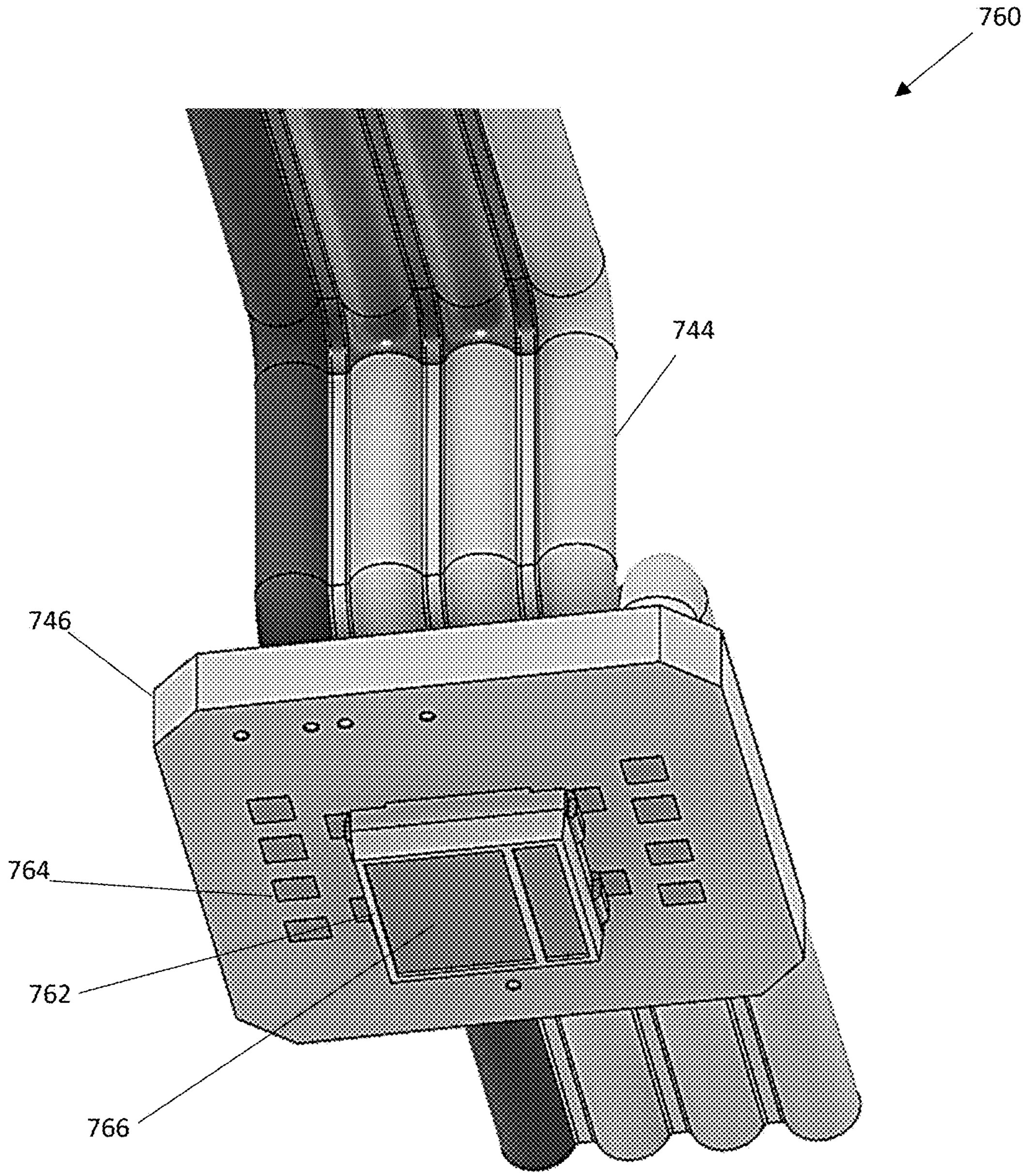
FIG. 7G is a diagram illustrating a bottom close-up view of the lower assembly and the wire of the bulb enclosure.

FIG. 7G is a diagram illustrating a bottom close-up view of the lower assembly 746 and the electrical wires 744 of the bulb enclosure 760. According to FIG. 7G, the diagram is shown having electrical wires 744 and PCB 746. On the lower surface of PCB 746 include processor 762, printed circuit board (PCB) circuit 764 and light emitting diode (LED) 766. LED 766 can also be a light bulb or smart bulb.

Figure 7H:
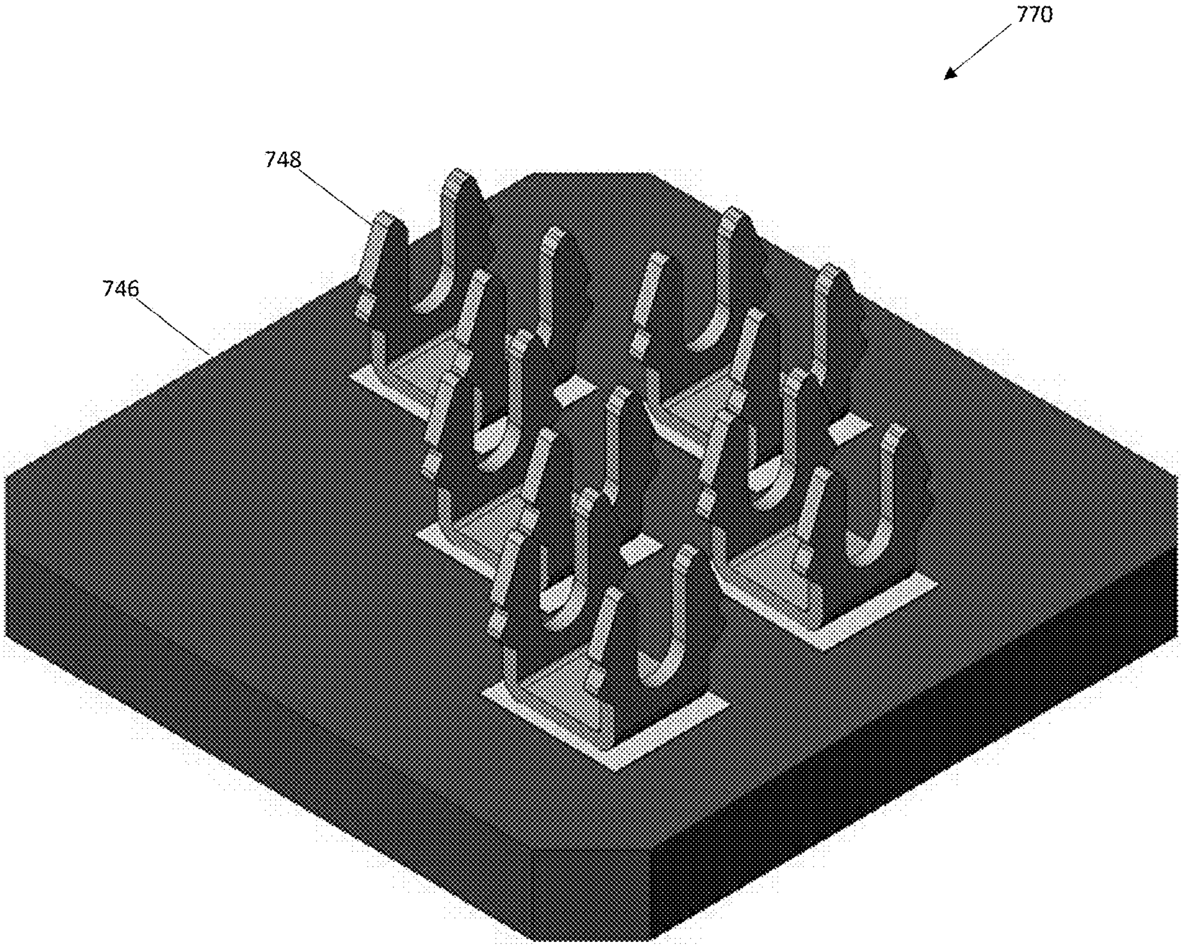
FIG. 7H is a diagram illustrating a close-up view of the lower assembly of the bulb enclosure showing IDC connection points.

FIG. 7H is a diagram illustrating a close-up view of the PCB 746 of the bulb enclosure 770. According to FIG. 7H, the diagram illustrates PCB 746 having a plurality of IDCs 748. IDCs 748 are made of conductive metal.

Figure 7I:
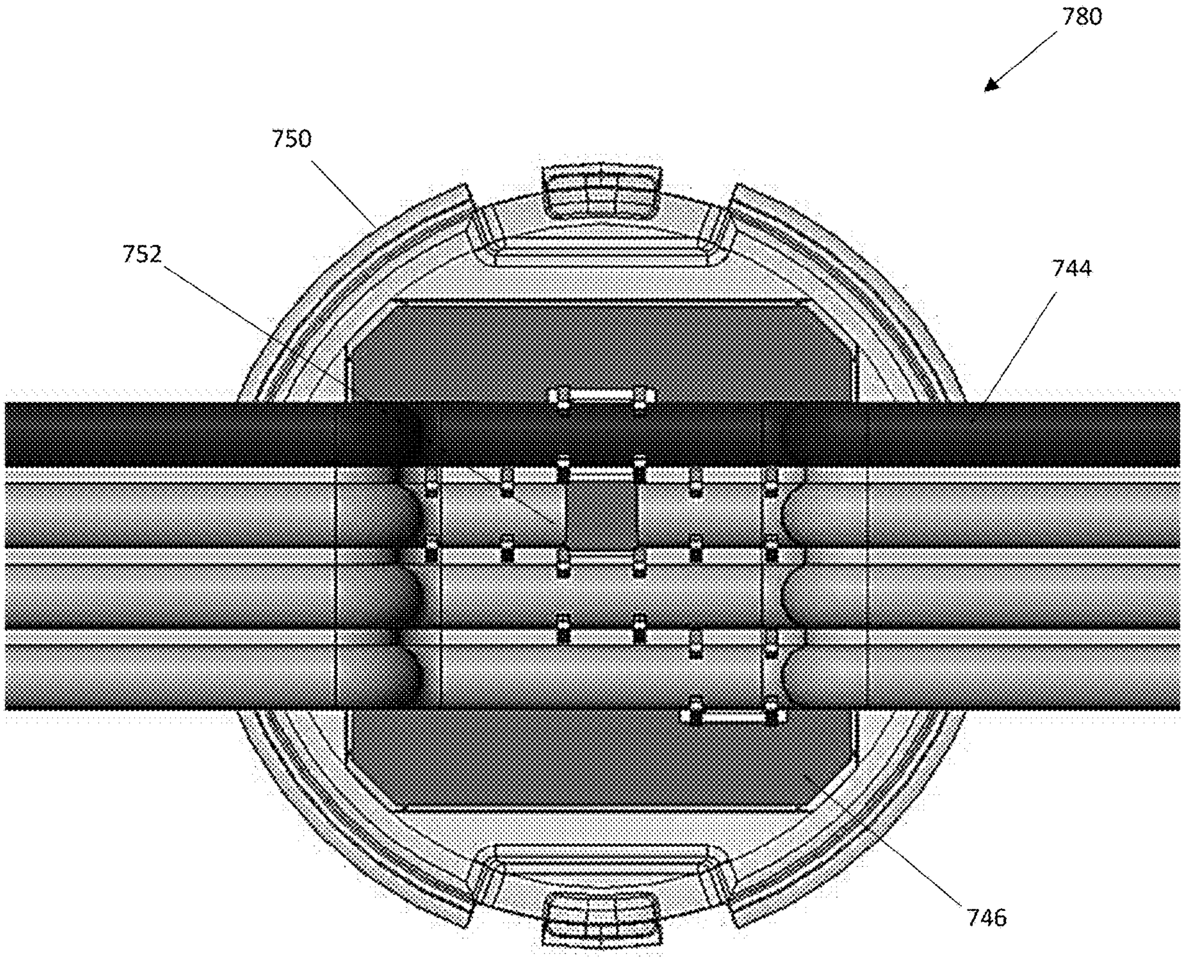
FIG. 7I is a diagram illustrating a top plan view of the bulb enclosure.

FIG. 7I is a diagram illustrating a top plan view of the bulb enclosure 780. According to FIG. 7I, the diagram shows housing 750, PCB 746, electrical wires 744 and insulation displacement connector (IDC) 752.

Figure 7J:
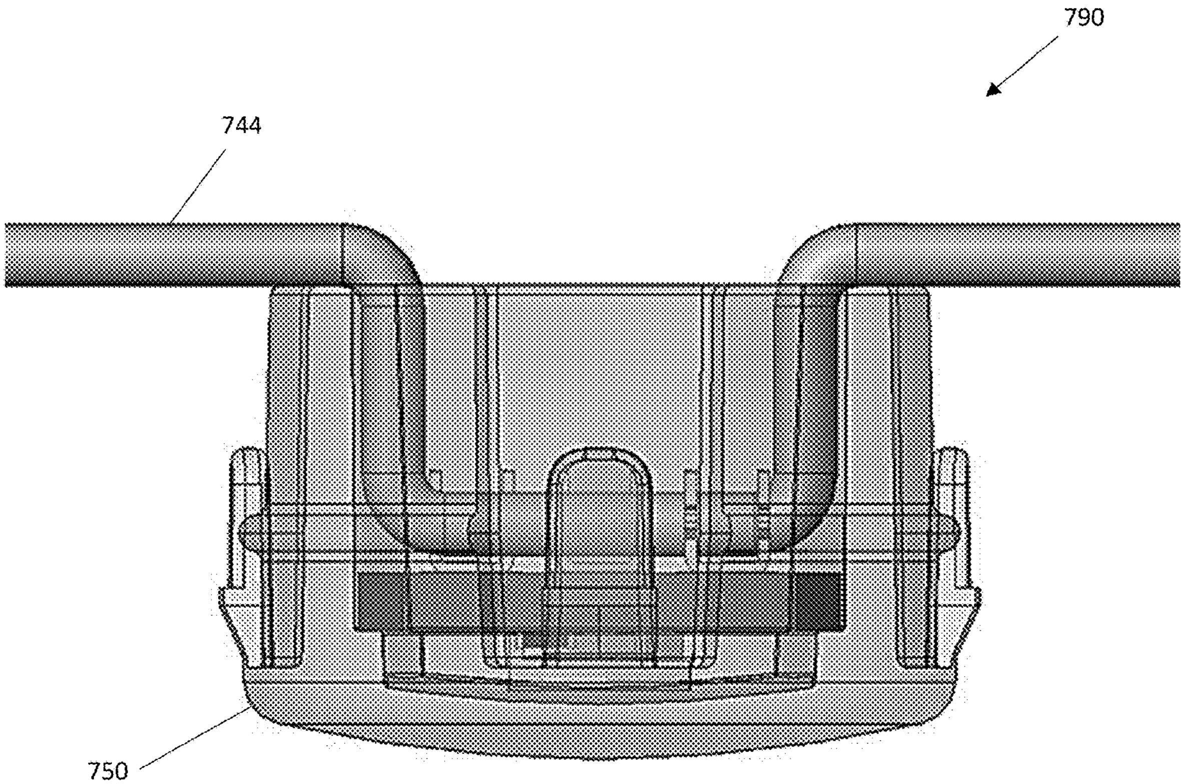
FIG. 7J is a diagram illustrating a side view of the bulb enclosure.

FIG. 7J is a diagram illustrating a side view of the bulb enclosure 790. According to FIG. 7J, the bulb enclosure 790 is shown having electrical wires 744 and housing 750. Housing 750 further comprises side fasteners to secure holes in the mounting track which then affixes to the roofline of a house.

Figure 8A:
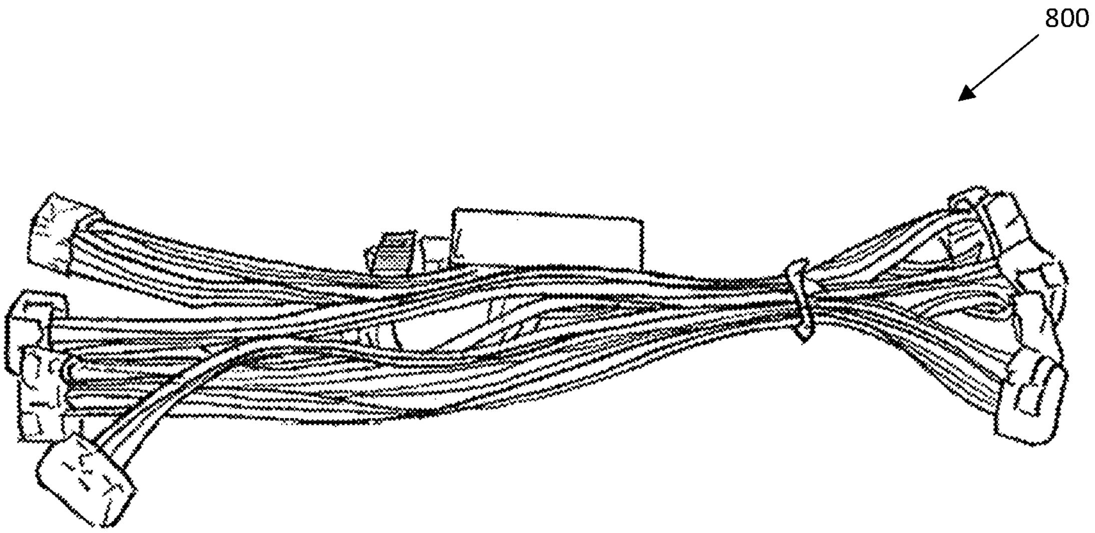
FIG. 8A is a diagram illustrating a photograph of the final assembly of the exemplary string lighting system.

FIG. 8A is a diagram illustrating a photograph of the final assembly of the exemplary string lighting system. According to FIG. 8A, exemplary string lighting system 800 is shown.

Figure 8B:
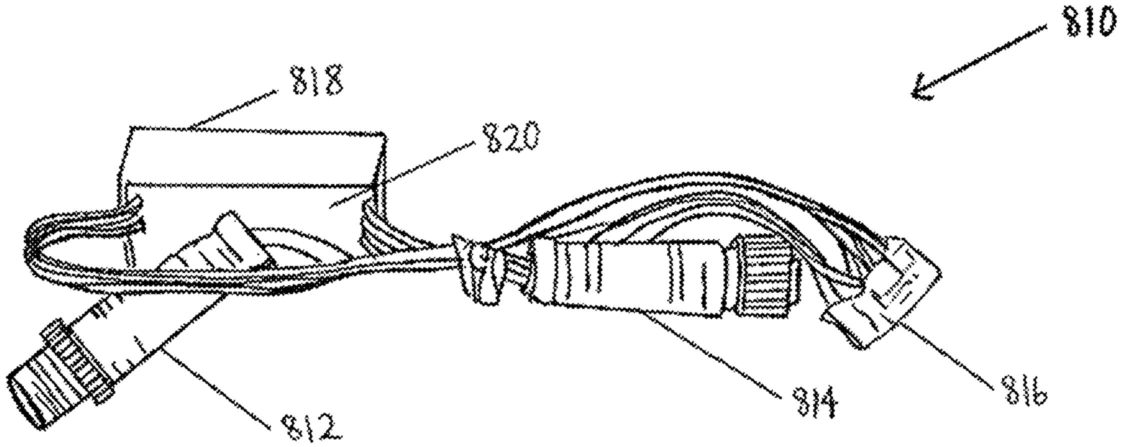
FIG. 8B is a diagram illustrating a photograph of the final assembly of the string lighting system illustrating the bulb enclosures.

FIG. 8B is a diagram illustrating a photograph of the final assembly of the string lighting system showing the bulb enclosures (or bulb connectors). According to FIG. 8B, string lighting system 810 is shown having male end connector 812, female end connector 814, bulb connector 816 and regulator enclosure 818. This also illustrates potting compound 820 which is applied to seal all components of the bulb and regulator housings to prevent water and dust ingress. In place of, or in addition to, using potting compound 820 for sealing, a conformal coating or water-tight seal lid may be used.

Features

According to the disclosure, the following are some features of the string lighting system:

- Integrated Switching Power Supply: The light strings incorporate a compact, efficient switching power supply built into the light string itself. This power supply is capable of receiving a higher input voltage in the range of 12-36V and regulating it down to the required operating voltage for the individual bulbs, typically between 3-12V. This allows for a more flexible and efficient power distribution system.
- Voltage Regulation: The built-in regulator ensures that each bulb in the light string receives a stable and appropriate voltage, regardless of variations in the input voltage or the length of the light string. This enhances the reliability and lifespan of the bulbs by preventing overvoltage or undervoltage conditions.
- Simplified Wiring: By integrating the power supply into the light strings, the need for separate power and data wires is eliminated. The light strings can be connected using a single set of wires, which simplifies the installation process and reduces the number of potential failure points in the system.
- Minimized Connection Points: The integrated design reduces the number of connection points that an installer has to make in the field between the power source and the individual bulbs, which not only simplifies installation but also improves the overall reliability of the system. Having fewer connection points means less risk of loose connections and corrosion over time.
- Reduced Electrical Line Losses: By regulating down the voltage closer to the point of use, the invention reduces electrical line losses that would otherwise occur if lower voltages were transmitted over longer wire distances. This improves the overall efficiency of the lighting system and allows for longer runs of light strings without significant power loss.
- Waterproof connectors: The light string connects to adjacent strings with waterproof connectors. Typically, these connectors contain an O-ring and are twisted or locked together providing pressure on the O-ring, making the connectors waterproof.

Components

The following are components of the disclosure:

- Switching Regulator Circuit: Each light string includes a compact switching regulator circuit designed to step down the input voltage from (typically 12V-36V) to the required operating voltage for the bulbs. The regulator is designed to handle varying input voltages while providing a stable output, ensuring consistent performance across the entire light string.
- Integration into Light strings: The switching regulator is integrated directly into the housing of the light string, making it part of the overall assembly. This integration allows for a streamlined design that requires no additional components or wiring beyond the light string itself.
- Connection and Operation: The light strings are designed to be easily connected in series, with the integrated power supply ensuring that each bulb receives the correct operating voltage. The system is designed to operate efficiently even in long runs, with minimal power loss because the higher voltage (typically 12V-36V) is used on the longer wire runs.

According to the disclosure, the string lighting system is configured to support data transfer. The data transfer operates as follows. A controller sends a long stream of data that contains the Red Green Blue (RGB) or Red Green Blue White (RGBW) brightness settings (meaning values for each of Red, Green and Blue brightness components, or Red, Green, Blue and White brightness components) for each bulb in a long string of lights in a particular section of roofline. The data stream enters the first bulb, and the processor within the bulb assembly receives the data and looks at the first 3 or 4 bytes to get the brightness values for its RGB (or Red Green Blue White (RGBW)) LED within that bulb. Then that bulb outputs the exact same data signal, excluding the first 3 or 4 bytes that it was sent. Therefore, each bulb, in turn, consumes (i.e. processes and removes) the first 3 or 4 bytes of the data stream that it was sent.

According to the disclosure, the string lighting system includes an integrated regulator in the lighting string which provides several benefits. Existing light strings are typically made with a 3-conductor 20AWG wire that contain V+, data and ground. The V+ is used by the LED directly so is typically in the range of 5-12V. Because this voltage is quite low and there are typically 50 ft+ feet of lights attached in a section of roofline, one may end up with a problem very quickly where the voltage begins to drop below the 5-12V that was supplied. Typically, within 15 ft, the voltage has dropped so much that it isn't high enough to adequately power the LEDs. Typically, the blue and green LEDS will start to operate dimmer. To combat this problem, other implementations typically use a larger 2 conductor wire alongside the light string in the track that holds the lights. This wire is typically in the range of 8-14 AWG which has less resistance and thereby has less voltage drop over longer lengths. Installers would then tap in the 5-12V and GND from that larger gauge wire into the light string every 8-25 ft. One disadvantage of this approach is that there are additional connections, which are more prone to failure. Furthermore, the 12AWG wire is thicker, more expensive and makes installation slower (thereby increasing costs). Incorporating an integrated regulator in the string lighting system may reduce overall costs and reduce install time by over 30%.

According to the preferred embodiment of the disclosure, by operating at 24V, there is less transmission loss and no need to use a secondary wire. Furthermore, by regulating down in each string to the lower voltage using highly efficient switching regulators, one does not have to worry about transmission loss in the lower voltage line since the line only extends 3-4 ft from the point that it is regulated.

According to the disclosure, building the regulator into the light string (or light string system) enables installers to easily connect light strings for faster, more efficient installation. Installers would simply plug one string into the next to create a larger or longer light string system without having to run a second wire or making extra connections.

According to the disclosure, additional conductor lines may be considered. For example, further embodiments may have smart chips that have a back-up data signal that runs along with the data signal whereby a 5-conductor line in the string may be implemented.

According to further embodiments of the disclosure, a filter (i.e., a passive low pass filter) is connected to the data output pin on the processor inside the bulb assembly. The filter assists in modulating or attenuating higher frequency harmonics on the data signal that transfers from bulb to bulb, which harmonics may also impact FCC radiated emissions compliance (i.e., FCC part 15 iifc).

According to the disclosure, a bulb assembly for a holiday lighting system is disclosed. The bulb assembly comprises a housing, a plurality of electrical wires that are substantially shaped to conform to the housing when assembled and a printed circuit board (PCB). The PCB further comprises a plurality of insulation displacement connectors (IDC) or solder pads disposed on the upper surface of the PCB, a light source disposed on the lower surface of the PCB and a processor disposed on the PCB and configured to receive serial data signal to control the light source brightness levels;

According to the disclosure, the plurality of electrical wires electrically connects to the IDCs and the PCB, processor, light source and wire connections are sealed from water ingress by either a potting compound, conformal coating, or by a water-tight seal lid.

According to the disclosure, the bulb assembly further comprises an upper assembly wherein the upper assembly detachably secures onto the top surface of the plurality of electrical wires. The housing is substantially circular in shape. Tthe light source is a light bulb, a smart bulb or a light emitting diode (LED), a Red Green Blue (RGB) LED or a Red Green Blue White (RGBW) LED.

According to the disclosure, the processor is configured to use 3 or 4 bytes data to determine the LED brightness levels. The plurality of electrical wires further comprises a data wire, whereby the data wire is configured to have a break in the circuit within each bulb assembly. Furthermore, the housing comprises retaining clips to retain the housing within a metal track which is mounted to an architectural structure.

According to the disclosure, a lighting string system for a permanently installed holiday lights is disclosed. The lighting string system comprises a male connector, a female connector, a plurality of electrical wires, a switching regulator built into the lighting string system and one or more bulb assemblies. Each bulb assembly further comprises a housing and a printed circuit board (PCB).

The PCB further comprises a plurality of insulation displacement connectors (IDC) or solder pads or at least one electrical connector disposed on the upper surface of the PCB, a light source disposed on the lower surface of the PCB and at least one processor disposed on the PCB and configured to receive a serial data signal to control light source brightness levels.

According to the disclosure, the plurality of electrical wires electrically connect to either the IDCs, solder pads or the at least one electrical connector. The plurality of electrical wires is placed between the input male connector and output female connector. The electrical wires connects the plurality of bulb assemblies and the regulator to form a circuit. Furthermore, the PCB, processor, light source and wire connections are sealed from water ingress.

According to the disclosure, the light source of the light string system is a light bulb, a smart bulb or a light emitting diode (LED) and the bulb is circular with dimensions in the range of 10 mm-50 mm. The plurality of electrical wires are 4 conductor wires further comprising V+, ground (GND), data and 5V wires. The 5V wire can also function in a range of 3.5V up to 12V.

According to the disclosure, the male connector and female connector is a 3-pin connector having 24V, data and ground lines. The male connector further comprises a water resistant M12 locking nut and the female connector further comprises a water resistant M12 style connector threaded bolt.

According to the disclosure, the processor is configured to process 3-4 bytes of data and the plurality of electrical wires further comprises a data wire and the data wire is configured to have a break in the circuit. The regulator is configured to regulate 24V input, regulate down to 5V and distribute 5V to the bulb within the string. The light string system passes ground, data, and a higher voltage 12V-36V from its input and output connectors.

According to the disclosure, the bulb assembly and regulator electronics are protected from water ingress by using a potting compound or conformal coating or waterproof lid. The regulator is a switching regulator that is built into the string, wherein the regulator takes the higher 12V-36V and creates the voltage used by the LED and processor in the light string system. The individual bulb spacing is between 90 mm to 460 mm.

According to the disclosure, the light string system further comprises a passive low pass filter connected to the data output pin on the processor inside the bulb assembly, the passive low pass filter configured to modulate, attenuate or otherwise control higher frequency harmonics on the data signal transfer from the plurality of bulb assemblies. The regulator is a switching regulator further comprising a switching regulator circuit.

According to the disclosure, a light string for a permanent holiday lighting system is disclosed. The light string comprises a plurality of bulbs each operating at a lower voltage between 3V and 12V, an integrated switching power supply built into the light string capable of receiving an input voltage between 12V and 36V and regulating it down to 3V to 12V for use by the bulbs, a simplified wiring system that eliminates the need for separate power and data wires, reducing the number of connection points and improving system reliability, and a design that reduces electrical line losses by regulating voltage within 12 feet of the point of use.

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. It should be noted that a computer-readable medium may be tangible and non-transitory. As used herein, the term "code" may refer to software, instructions, code or data that is/are executable by a computing device or processor. A "module" can be considered as a processor executing computer-readable code.

A processor as described herein can be a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, or microcontroller, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. In some embodiments, a processor can be a graphics processing unit (GPU). The parallel processing capabilities of GPUs can reduce the amount of time for training and using neural networks (and other machine learning models) compared to central processing units (CPUs). In some embodiments, a processor can be an ASIC including dedicated machine learning circuitry custom-build for one or both of model training and model inference.

The disclosed or illustrated tasks can be distributed across multiple processors or computing devices of a computer system, including computing devices that are geographically distributed. The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on." While the foregoing written description of the system enables one of ordinary skill to make and use what is considered presently to be the best mode thereof, those of ordinary skill will understand and appreciate the existence of variations, combinations, and equivalents of the specific embodiment, method, and examples herein. The system should therefore not be limited by the above-described embodiment, method, and examples, but by all embodiments and methods within the scope and spirit of the system. Thus, the present disclosure is not intended to be limited to the implementations shown herein but is to be accorded the widest scope consistent with the principles and novel features disclosed herein.

What is claimed is:

1. A bulb assembly for a holiday lighting system comprising:
- a housing;
- a plurality of electrical wires that are substantially shaped to conform to the housing when assembled;
- a printed circuit board (PCB) having a first surface and a second surface opposite the first surface, the PCB further comprising:
  - a plurality of insulation displacement connectors (IDC) or solder pads, disposed on the first surface of the PCB;
  - a light source is a light emitting diode (LED) and is disposed on the second surface of the PCB; and
  - a processor disposed on the PCB and configured to:
    - receive serial data signal to control the light source brightness levels; and
    - use 3 or 4 bytes data to determine the LED brightness levels;
- wherein the plurality of electrical wires electrically connects to the IDCs or solder pads;
- wherein the PCB, processor, light source and wire connections form a circuit sealed from water ingress by either a potting compound, conformal coating, or by a water-tight seal lid.

2. The bulb assembly of claim 1 further comprising an upper assembly wherein the upper assembly detachably secures onto the top surface of the plurality of electrical wires.

3. The bulb assembly of claim 1 wherein the housing is substantially circular in shape.

4. The bulb assembly of claim 1 wherein the light source is a light bulb, a smart bulb or a light emitting diode (LED), a Red Green Blue (RGB) LED or a Red Green Blue White (RGBW) LED.

5. The bulb assembly of claim 1 wherein the plurality of electrical wires further comprises a data wire, whereby the data wire is configured to have a break in a circuit within each bulb assembly.

6. The bulb assembly of claim 1 wherein the housing comprises retaining clips to retain the housing within a metal track which is mounted to an architectural structure.

7. A lighting string system for a permanently installed holiday lights comprising:
- a male connector;
- a female connector;
- a plurality of electrical wires;
- a switching regulator built into the lighting string system; and
- one or more bulb assemblies, each bulb assembly further comprising:
  - a housing;
  - a printed circuit board (PCB) having a first surface and a second surface opposite the first surface, the PCB further comprising:
    - a plurality of insulation displacement connectors (IDC) or solder pads or at least one electrical connector, disposed on the first surface of the PCB;
    - a light source disposed on the second surface of the PCB; and
    - at least one processor disposed on the PCB and configured to:
      - receive a serial data signal to control light source brightness levels; and
      - process 3-4 bytes of data;
- wherein the plurality of electrical wires:
  - comprises a data wire and the data wire is configured to have a break in the circuit;
  - electrically connect to either the IDCs, solder pads or the at least one electrical connector;
  - is placed between the male connector and female connector; and connects the plurality of bulb assemblies and the regulator to form a circuit;

wherein the PCB, processor, light source and wire connections form a circuit sealed from water ingress.

8. The lighting string system of claim 7 wherein the light source is a light bulb, a smart bulb or a light emitting diode (LED), and the bulb assembly is circular with dimensions in the range of 10 mm-50 mm.

9. The lighting string system of claim 7 wherein the plurality of electrical wires are 4 conductor wires further comprising V+, ground (GND), data and 5V wires.

10. The light sting system of claim 8 wherein the male connector and female connector is a 3-pin connector having 24V, data and ground lines.

11. The light string system of claim 7 wherein the male connector further comprises a water resistant M12 locking nut and the female connector further comprises a water resistant M12 style connector threaded bolt.

12. The light string system of claim 7 wherein the regulator is configured to regulate 24V input, regulate down to 5V and distribute 5V to the bulb within the string.

13. The light string system of claim 7 wherein the light string system passes ground, data, and a higher voltage 12V-36V from its input and output connectors.

14. The light string system of claim 7 wherein the bulb assembly and regulator electronics are protected from water ingress by using a potting compound or conformal coating or waterproof lid.

15. The light string system of claim 7 wherein the regulator is a switching regulator that is built into the string, wherein the regulator takes the higher 12V-36V and creates the voltage used by the LED and processor in the light string system.

16. The light string system of claim 7 wherein the individual bulb spacing is between 90 mm to 460 mm.

17. The light string system of claim 7 wherein the light string system further comprises a passive low pass filter connected to the data output pin on the processor inside the bulb assembly, the passive low pass filter configured to modulate, attenuate or otherwise control higher frequency harmonics on the data signal transfer from the plurality of bulb assemblies.

18. The light string system of claim 7 wherein the regulator is a switching regulator further comprising a switching regulator circuit.

* * * * *